United States Patent
Chan et al.

(10) Patent No.: US 11,663,494 B2
(45) Date of Patent: May 30, 2023

(54) SYSTEMS AND METHODS FOR HIERARCHICAL MULTI-OBJECTIVE OPTIMIZATION

(71) Applicant: UCHICAGO ARGONNE, LLC, Chicago, IL (US)

(72) Inventors: Henry Chan, Schaumburg, IL (US); Mathew J. Cherukara, Darien, IL (US); Badri Narayanan, Louisville, KY (US); Subramanian Sankaranarayanan, Naperville, IL (US); Stephen K. Gray, Wheaton, IL (US); Troy David Loeffler, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 730 days.

(21) Appl. No.: 16/704,936

(22) Filed: Dec. 5, 2019

(65) Prior Publication Data
US 2021/0174215 A1    Jun. 10, 2021

(51) Int. Cl.
*G06F 30/30*     (2020.01)
*G06N 20/00*     (2019.01)
(Continued)

(52) U.S. Cl.
CPC ........... *G06N 3/126* (2013.01); *G06F 16/282* (2019.01)

(58) Field of Classification Search
CPC ............................. G06N 3/126; G06F 16/282
See application file for complete search history.

(56) References Cited

U.S. PATENT DOCUMENTS 6,128,609 A    10/2000  Rose
6,882,739 B2    4/2005  Kurtz et al.
(Continued)

FOREIGN PATENT DOCUMENTS

CN    107563574 A    1/2018
CN    108280207 A    7/2018
(Continued)

OTHER PUBLICATIONS

Boulton & Hindmarsh, "Sediment deformation beneath glaciers: Rheology and geological consequences," Journal of Geophysical Research: Solid Earth 92(B9), pp. 9059-9082 (1987).
(Continued)

*Primary Examiner* — Brandon S Cole
(74) *Attorney, Agent, or Firm* — Foley & Lardner LLP

(57) ABSTRACT

A method for optimizing objective functions can include selecting an objective function based at least on a hierarchy, applying parameters to the objective function to generate an output, responsive to the output not satisfying a tolerance condition, assigning a penalty to the set of parameters and evaluating a convergence condition using the set of parameters and the penalty, responsive to the output satisfying the tolerance condition, evaluating an additional objective function using the parameters in an order corresponding to the hierarchy or evaluating the convergence condition responsive to the selected objective function being a final objective function, modifying the set of parameters using a genetic algorithm responsive to the set of parameters not satisfying the convergence condition, and outputting the set of parameters responsive to the set of parameters satisfying the convergence condition.

18 Claims, 4 Drawing Sheets

(51) Int. Cl.
*G06N 3/08* (2023.01)
*G06N 3/126* (2023.01)
*G06F 16/28* (2019.01)

(56) References Cited

U.S. PATENT DOCUMENTS

| | | | |
|---|---|---|---|
| 7,672,815 B2* | 3/2010 | Asgari | G06N 20/00 703/2 |
| 7,680,557 B2 | 3/2010 | Kim et al. | |
| 8,117,141 B1 | 2/2012 | Srinivasa et al. | |
| 8,219,511 B2 | 7/2012 | Yang et al. | |
| 8,835,895 B2 | 9/2014 | Sumino et al. | |
| 8,871,670 B2 | 10/2014 | Seebauer | |
| 8,932,347 B2 | 1/2015 | Choubey et al. | |
| 9,175,174 B2 | 11/2015 | Kambe | |
| 9,525,032 B2 | 12/2016 | Slack et al. | |
| 9,683,682 B2 | 6/2017 | Narayanan et al. | |
| 9,727,824 B2 | 8/2017 | Rose et al. | |
| 9,731,371 B2 | 8/2017 | Enyedy et al. | |
| 9,823,737 B2 | 11/2017 | Mazed et al. | |
| 9,833,862 B2 | 12/2017 | Denney et al. | |
| 9,839,978 B2 | 12/2017 | Narayanan et al. | |
| 9,914,765 B2 | 3/2018 | Timmer et al. | |
| 9,937,580 B2 | 4/2018 | Peters et al. | |
| 10,023,795 B2 | 7/2018 | Ning | |
| 10,046,419 B2 | 8/2018 | Denney et al. | |
| 10,052,706 B2 | 8/2018 | Henry et al. | |
| 10,052,707 B2 | 8/2018 | Henry et al. | |
| 10,068,973 B2 | 9/2018 | Slack et al. | |
| 10,087,079 B2 | 10/2018 | Steiner et al. | |
| 10,419,655 B2 | 9/2019 | Sivan | |
| 10,529,003 B2 | 1/2020 | Mazed | |
| 10,584,916 B2 | 3/2020 | Gan et al. | |
| 11,501,210 B1 | 11/2022 | Zhdanov et al. | |
| 2003/0217026 A1* | 11/2003 | Teig | G06F 30/30 |
| 2013/0159206 A1* | 6/2013 | Barahona | G06Q 50/28 705/338 |
| 2015/0081599 A1 | 3/2015 | Dobler | |
| 2015/0106035 A1 | 4/2015 | Vecchio et al. | |
| 2015/0199607 A1 | 7/2015 | Fang | |
| 2016/0179162 A1* | 6/2016 | Eastep | G06F 9/4881 713/320 |
| 2017/0261949 A1* | 9/2017 | Hoffmann | G05B 13/0265 |
| 2017/0285123 A1 | 10/2017 | Kaditz | |
| 2018/0136356 A1 | 5/2018 | Wilson et al. | |
| 2018/0165603 A1* | 6/2018 | Van | G06N 3/0454 |
| 2018/0240031 A1 | 8/2018 | Huszar et al. | |
| 2018/0361514 A1* | 12/2018 | Narayanan | B25J 9/163 |
| 2019/0050628 A1 | 2/2019 | Sankaranarayanan et al. | |
| 2019/0279094 A1 | 9/2019 | Baughman et al. | |
| 2019/0370955 A1 | 12/2019 | Zhang et al. | |
| 2020/0042776 A1 | 2/2020 | Shen et al. | |
| 2020/0250491 A1 | 8/2020 | Peng et al. | |
| 2021/0042609 A1 | 2/2021 | Owoyele et al. | |
| 2021/0089921 A1 | 3/2021 | Aghdasi et al. | |
| 2021/0174215 A1* | 6/2021 | Chan | G06F 16/282 |
| 2021/0233191 A1 | 7/2021 | Shin et al. | |
| 2022/0101828 A1 | 3/2022 | Fukutomi et al. | |

FOREIGN PATENT DOCUMENTS

| | | |
|---|---|---|
| CN | 108304679 A | 7/2018 |
| CN | 108427939 A | 8/2018 |
| CN | 108896943 A | 11/2018 |
| CN | 109146064 A | 1/2019 |
| CN | 109657793 A | 4/2019 |
| CN | 109918684 A | 6/2019 |
| CN | 109920501 A | 6/2019 |
| CN | 110619527 A | 12/2019 |
| CN | 110737824 A | 1/2020 |
| CN | 110745136 A | 2/2020 |
| CN | 110879951 A | 3/2020 |
| WO | WO-2019/012279 A1 | 7/2018 |

OTHER PUBLICATIONS

Budd & Jacka, "A review of ice rheology for ice sheet modelling," Cold Regions Science & Technology 16(2), pp. 107-144 (1989).
Darre, et al., "Coarse-grained models of water," WIREs Computational Molecular Science 2(6), pp. 921-930 (2012).
Ghormley, "Enthalpy Changes and Heat-Capacity Changes in the Transformations from High-Surface-Area Amorphous Ice to Stable Hexagonal Ice," The Journal of Chemical Physics 48, pp. 503-508 (1968).
Gillen, et al., "Self-Diffusion in Liquid Water to -31 C," Journal of Chemical Physics 57(12), pp. 5117-5119 (1972).
Gillen, et al., "Self-Diffusion in Liquid Water to -31C," The Journal of Chemical Physics 57, pp. 5117-5119 (1972).
Hudait, et al., "Free energy contributions and structural characterization of stacking disordered ices," Physical Chemistry Chemical Physics 18(14), pp. 9544-9553 (2016).
Jorgensen & Madura, "Temperature and size dependence for Monte Carlo simulations of TIP4P water," Molecular Physics 56(6), pp. 1381-1392 (1985).
Ketcham & Hobbs, "An experimental determination of the surface energies of ice," The Philosophical Magazine: A Journal of Theoretical Experimental and Applied Physics 19(162), pp. 1161-1173 (1969).
Lupi, et al., "Role of stacking disorder in ice nucleation," Nature 551, pp. 218-222 (2017).
McMillan & Los, "Vitreous Ice: Irreversible Transformations During Warm-Up," Nature 206, pp. 806-807 (1965).
Moore & Molinero, "Ice crystallization in water's 'no-man's land'," Journal of Chemical Physics 132, 244504 (2010).
Murray, et al., "The formation of cubic ice under conditions relevant to Earth's atmosphere," Nature 434, pp. 202-205 (2005).
Nada & Van Der Eerden, "An intermolecular potential model for the simulation of ice and water near the melting point: A six-site model of H2O," Journal of Chemical Physics 118(16), pp. 7401-7413 (2003).
Narten, et al., "Diffraction pattern and structure of amorphous solid water at 10 and 77 K," Journal of Chemical Physics 64, pp. 1106-1121 (1976).
Narten, et al., "Diffraction pattern and structure of amorphous solid water at 10 and 77K," The Journal of Chemical Physics 64, pp. 1106-1121 (1976).
Tersoff, "New empirical approach for the structure and energy of covalent systems," Physical Review B 37, pp. 6991-7000 (1988).
Abascal & Vega, "A general purpose model for the condensed phases of water: TIP4P/2005," Journal of Chemical Physics 123(23), 234505, 12 pages (2005).
Abascal & Vega, "A general purpose model for the condensed phases of water: TIP4P/2005," The Journal of Chemical Physics 123, 234505, 12 pages (2005).
Abascal, et al., "A potential model for the study of ices and amorphous water: TIP4P/Ice," Journal of Chemical Physics 122(23), 234511, 9 pages (2005).
Agarwal, et al., "Thermodynamic, Diffusional, and Structural Anomalies in Rigid-Body Water Models," Journal of Physical Chemistry B 115(21), pp. 6935-6945 (2011).
Agarwal, et al., "Thermodynamic, Diffusional, and Structural Anomalies in Rigid-Body Water Models," The Journal of Physical Chemistry C 115(21), pp. 6935-6945 (2011).
Amaya, et al., "How Cubic Can Ice Be?," The Journal of Physical Chemistry Letters 8(14), pp. 3216-3222 (2017).
Berendsen, et al., "The missing term in effective pair potentials," Journal of Physical Chemistry 91(24), pp. 6269-6271 (1987).
Bigg & Hopwood, "Ice Nuclei in the Antarctic," Journal of the Atmospheric Sciences 20(3), pp. 185-188 (1963).
Blackford, "Sintering and microstructure of ice: a review," Journal of Physics D: Applied Physics 40(21), pp. R355-R385 (2007).
Chickos & Acree, "Enthalpies of Sublimation of Organic and Organometallic Compounds. 1910-2001," Journal of Physical and Chemical Reference Data 31 (2), pp. 537-698 (2002).
Chickos & Acree, "Enthalpies of Sublimation of Organic and Organometallic Compounds. 1910-2001," Journal of Physical and Chemical Reference Data 31, 537 (2002).

(56) References Cited

OTHER PUBLICATIONS

Demott, et al., "Predicting global atmospheric ice nuclei distributions and their impacts on climate," Proceedings of the National Academy of Sciences 107(25), pp. 11217-11222 (2010).
Doran, et al., "Climate forcing and thermal feedback of residual lake-ice covers in the high Arctic," Limnology & Oceanography 41(5), pp. 839-848 (1996).
Durand, et al., "Deformation of grain boundaries in polar ice," Europhysics Letters 67(6), pp. 1038-1044 (2004).
Durham & Stern, "Rheological Properties of Water Ice—Applications to Satellites of the Outer Planets," Annual Review of Earth and Planetary Sciences 29, pp. 295-330 (2001).
Durham, et al., "Effects of dispersed particulates on the rheology of water ice at planetary conditions," Journal of Geophysical Research: Planets 97(E12), pp. 20883-20897 (1992).
Engel, et al., "Anharmonic Nuclear Motion and the Relative Stability of Hexagonal and Cubic ice," Physical Review X 5, 021033, 10 pages (2015).
Espinosa, et al., "The mold integration method for the calculation of the crystal-fluid interfacial free energy from simulations," The Journal of Chemical Physics 141, 134709, 16 pages (2014).
Ester, et al., "A density-based algorithm for discovering clusters a density-based algorithm for discovering clusters in large spatial databases with noise," Proceedings of the Second International Conference on Knowledge Discovery and Data Mining, pp. 226-231 (1996).
Ester, et al., "A Density-Based Algorithm for Discovering Clusters in Large Spatial Databases with Noise," Proceedings of the Second International Conference on Knowledge Discovery and Data Mining, pp. 226-231 (1996).
Faken, et al., "Systematic analysis of local atomic structure combined with 3D computer graphics," Computational Materials Science, vol. 2, Issue 2, pp. 279-286 (Mar. 1994).
Faria, et al., "The microstructure of polar ice. Part I: Highlights from ice core research," Journal of Structural Geology 61, pp. 2-20 (2014).
Fisher & Koerner, "On the Special Rheological Properties of Ancient Microparticle-Laden Northern Hemisphere Ice as Derived from Bore-Hole and Core Measurements," Journal of Glaciology 32(112), pp. 501-510 (1986).
Gow & Williamson, "Rheological implications of the internal structure and crystal fabrics of the West Antarctic ice sheet as revealed by deep core drilling at Byrd Station," Geological Society of America Bulletin 87(12), pp. 1665-1677 (1976).
Gow, et al., "Physical and structural properties of the Greenland Ice Sheet Project 2 ice core: A review," Journal of Geophysical Research: Oceans 102(C12), pp. 26559-26575 (1997).
Grenfell, et al., "Reflection of solar radiation by the Antarctic snow surface at ultraviolet, visible, and near-infrared wavelengths," Journal of Geophysical Research: Atmospheres 99(D9), pp. 18669-18684 (1994).
Hadley & McCabe, "Coarse-grained molecular models of water: a review," Molecular Simulation 38(8-9), pp. 671-681 (2012).
Haji-Akbari & Debenedetti, "Direct calculation of ice homogeneous nucleation rate for a molecular model of water," Proceedings of the National Academy of Sciences 112(34), pp. 10582-10588 (2015).
Handel, et al., "Direct Calculation of Solid-Liquid Interfacial Free Energy for Molecular Systems: TIP4P Ice-Water Interface," Physical Review Letters 100, 036104, 4 pages (2008).
Hansen, et al., "Modelling Ice Ic of Different Origin and Stacking-Faulted Hexagonal Ice Using Neutron Powder Diffraction Data," Physics and Chemistry of Ice: Proceedings of the 11th International Conference, pp. 201-208 (2007).
Henkelman & Jonsson, "Improved tangent estimate in the nudged elastic band method for finding minimum energy paths and saddle points," The Journal of Chemical Physics 113, pp. 9978-9985 (2000).
Henkelman, et al., "A climbing image nudged elastic band method for finding saddle points and minimum energy paths," The Journal of Chemical Physics 113, pp. 9901-9940 (2000).

Holz, et al., "Temperature-dependent self-diffusion coefficients of water and six selected molecular liquids for calibration in accurate 1H NMRPFG measurements," Physical Chemistry Chemical Physics 2(20), pp. 4740-4742 (2000).
Hondoh, "Dislocation mechanism for transformation between cubic ice Ic and hexagonal ice Ih," Philosophical Magazine 95(32), pp. 3590-3620 (2015).
Hondoh, et al., "Formation and annihilation of stacking faults in pure ice," The Journal of Physical Chemistry 87(21), pp. 4040-4044 (1983).
Horn, et al., "Development of an improved four-site water model for biomolecular simulations: TIP4P-Ew," Journal of Chemical Physics 120(20), pp. 9665-9678 (2004).
Jacobson, et al., "How Short Is Too Short for the Interactions of a Water Potential? Exploring the Parameter Space of a Coarse-Grained Water Model Using Uncertainty Quantification," The Journal of Physical Chemistry B 118(28), pp. 8190-8202 (2014).
Johnston & Molinero, "Crystallization, Melting, and Structure of Water Nanoparticles at Atmospherically Relevant Temperatures," Journal of the American Chemical Society 134(15), pp. 6650-6659 (2012).
Jorgensen & Tirado-Rives, "Potential energy functions for atomic-level simulations of water and organic and biomolecular systems," Proceedings of the National Academy of Sciences 102(19), pp. 6665-6670 (2005).
Jorgensen, et al., "Comparison of simple potential functions for simulating liquid water," Journal of Chemical Physics 79, pp. 926-935 (1983).
Kokhanovsky, et al., "Reflective properties of natural snow: approximate asymptotic theory versus in situ measurements," IEEE Transactions on Geoscience and Remote Sensing 43(7), pp. 1529-1535 (2005).
Kuhs, et al., "Extent and relevance of stacking disorder in 'ice Ic'," Proceedings of the National Academy of Sciences 109(52), pp. 21259-21264 (2012).
Kuo, et al., "Liquid Water from First Principles: Investigation of Different Sampling Approaches," The Journal of Physical Chemistry B 108(34), pp. 12990-12998 (2004).
Lee, "Temperature Dependence on Structure and Self-Diffusion of Water: A Molecular Dynamics Simulation Study using SPC/E Model," Bulletin of the Korean Chemical Society 34(12), pp. 3800-3804 (2013).
Li, et al., "Freeze casting of porous materials: review of critical factors in microstructure evolution," International Materials Review 57(1), pp. 37-60 (2013).
Liu, et al., "Direct Measurement of Critical Nucleus Size in Confined Volumes," Langmuir 23(13), pp. 7286-7292 (2007).
Lu, et al., "Coarse-Graining of TIP4P/2005, TIP4P-Ew, SPC/E, and TIP3P to Monatomic Anisotropic Water Models Using Relative Entropy Minimization," Journal of Chemical Theory and Computation 10(9), pp. 4104-4120 (2014).
Mahoney & Jorgensen, "A five-site model for liquid water and the reproduction of the density anomaly by rigid, nonpolarizable potential functions," Journal of Chemical Physics 112(20), pp. 8910-8922 (2000).
Mahoney & Jorgensen, "A five-site model for liquid water and the reproduction of the density anomaly by rigid, nonpolarizable potential functions," The Journal of Chemical Physics 112, pp. 8910-8922 (2000).
Majewski, et al., "Toward a Determination of the Critical Size of Ice Nuclei. A Demonstration by Grazing Incidence X-ray Diffraction of Epitaxial Growth of Ice under the C31H63OH Alcohol Monolayer," Journal of Physical Chemistry 98(15), pp. 4087-4093 (1994).
Malkin, et al., "Stacking disorder in ice I," Physical Chemistry Chemical Physics 17(1), pp. 60-76 (2015).
Malkin, et al., "Structure of ice crystallized from supercooled water," Proceedings of the National Academy of Sciences 109(4), pp. 1041-1045 (2012).
Mangold, et al., "Experimental and theoretical deformation of ice-rock mixtures: Implications on rheology and ice content of Martian permafrost," Planetary and Space Science 50(4), pp. 385-401 (2002).

(56) References Cited

OTHER PUBLICATIONS

Maras, et al., "Global transition path search for dislocation formation in Ge on Si(001)," Cornell University Library Materials Science, 29 pages (Jan. 25, 2016).
Maras, et al., "Global transition path search for dislocation formation in Ge on Si(001)," Computer Physics Communications 205, pp. 13-21 (2016).
Marrone & Car, "Nuclear Quantum Effects in Water," Physical Review Letters 101, 017801, 4 pages (2008).
Molinero & Moore, "Water Modeled as an Intermediate Element between Carbon and Silicon," The Journal of Physical Chemistry B 113(13), pp. 4008-4016 (2009).
Montagnant & Duval, "The viscoplastic behaviour of ice in polar ice sheets: experimental results and modelling," Comptes Rendus Physique 5(7), pp. 699-708 (2004).
Montagnat & Duval, "Rate controlling processes in the creep of polar ice, influence of grain boundary migration associated with recrystallization," Earth and Planetary Science Letters 183(1-2), pp. 179-186 (2000).
Montagnat, et al., "Lattice distortion in ice crystals from the Vostok core (Antarctica) revealed by hard X-ray diffraction; implication in the deformation of ice at low stresses," Earth and Planetary Science Letters 214(1-2), pp. 369-378 (2003).
Moore & Molinero, "Is it cubic? Ice crystallization from deeply supercooled water," Physical Chemistry Chemical Physics 13(44), pp. 20008-20016 (2011).
Nakano, "A space-time-ensemble parallel nudged elastic band algorithm for molecular kinetics simulation," Computer Physics Communications 178(4), pp. 280-289 (2008).
Nelder & Mead, "A Simplex Method for Function Minimization," The Computer Journal 7(4), pp. 308-313 (1965).
Orsi, et al., "Comparative assessment of the ELBA coarse-grained model for water," Molecular Physics 112(11), pp. 1566-1576 (2014).
Perovich & Elder, "Temporal evolution of Arctic sea-ice temperature," Annals of Glaciology 33, pp. 207-211 (2001).
Perovich, et al., "Variability in Arctic sea ice optical properties," Journal of Geophysical Research: Oceans 103(C1), pp. 1193-1208 (1998).
Petrovic, "Review Mechanical properties of ice and snow," Journal of Materials Science 38(1), pp. 1-6 (2003).
Pi, et al., "Anomalies in water as obtained from computer simulations of the TIP4P/2005 model: density maxima, and density, isothermal compressibility and heat capacity minima," Molecular Physics 107(4-6), pp. 365-374 (2009).
Plata, et al., "An efficient and accurate framework for calculating lattice thermal conductivity of solids: AFLOW—AAPL Automatic Anharmonic Phonon Library," npj Computational Materials 3, 45, 10 pages (2017).
Plimpton, "Fast Parallel Algorithms for Short-Range Molecular Dynamics," Journal of Computational Physics 117(1), pp. 1-19 (1995).
Qiu, et al., "Is Water at the Graphite Interface Vapor-like or Ice-like?," The Journal of Physical Chemistry B 122(13), pp. 3626-3634 (2018).
Reddy, et al., "On the accuracy of the MB-pol many-body potential for water: Interaction energies, vibrational frequencies, and classical thermodynamic and dynamical properties from clusters to liquid water and ice," The Journal of Chemical Physics 145, 194504, 37 pages (2016).
Ren & Ponder, "Polarizable Atomic Multipole Water Model for Molecular Mechanics Simulation," The Journal of Physical Chemistry B 107(24), pp. 5933-5947 (2003).
Schiotz, et al., "Softening of nanocrystalline metals at very small grain sizes," Nature 391, pp. 561-563 (1998).
Shilling, et al., "Measurements of the vapor pressure of cubic ice and their implications for atmospheric ice clouds," Geophysical Research Letters 33(17), L17801, 5 pages (2006).
Skinner, et al., "The structure of water around the compressibility minimum," Journal of Chemical Physics 141, 214507, 7 pages (2014).
Skinner, et al., "The structure of water around the compressibility minimum," The Journal of Chemical Physics 141, 214507, 7 pages (2014).
Smith, et al., "Less is more: Sampling chemical space with active learning," The Journal of Chemical Physics 148, 241733, 24 pages (2018).
Soper, "The Radial Distribution Functions of Water as Derived from Radiation Total Scattering Experiments: Is There Anything We Can Say for Sure?," ISRN Physical Chemistry, 279463, 67 pages (2013).
Soper, "The Radial Distribution Functions of Water as Derived from Radiation Total Scattering Experiments: Is There Anything We Can Say for Sure?," International Scholarly Research Notices: Physical Chemistry 2013, 279463, 67 pages (2013).
Sosso, et al., "Crystal Nucleation in Liquids: Open Questions and Future Challenges in Molecular Dynamics Simulations," Chemical Reviews 116(12), pp. 7078-7116 (2016).
Stuart, et al., "A reactive potential for hydrocarbons with intermolecular interactions," The Journal of Chemical Physics 112, pp. 6472-6486 (2000).
Stukowski, "Visualization and analysis of atomistic simulation data with OVITO-the Open Visualization Tool," Modelling and Simulation in Materials Science and Engineering 18, 015012, 7 pages (2010).
Togo & Tanaka, "First principles phonon calculations in materials science," Scripta Materlialia 108, pp. 1-5 (2015).
Ushio, "Factors affecting fast-ice break-up frequency in Lutzow-Holm Bay, Antarctica," Annals of Glaciology 44, pp. 177-182 (2006).
Vega & Abascal, "Relation between the melting temperature and the 406 temperature of maximum density for the most common models of water," Journal of Chemical Physics 123(14), 144504, 8 pages (2005).
Vega & Abascal, "Relation between the melting temperature and the temperature of maximum density for the most common models of water," The Journal of Chemical Physics 123, 144504, 8 pages (2005).
Vega & Abascal, "Simulating water with rigid non-polarizable models: a general perspective," Physical Chemistry Chemical Physics 13(44), pp. 19663-19688 (2011).
Vega, et al., "The melting temperature of the most common models of water," The Journal of Chemical Physics 122, 114507, 9 pages (2005).
Vega, et al., "What ice can teach us about water interactions: a critical comparison of the performance of different water models," Faraday Discussions 141, pp. 251-276 (2009).
Wang, et al., "Systematic Improvement of a Classical Molecular Model of Water," The Journal of Physical Chemistry B 117(34), pp. 9956-9972 (2013).
Warren, "Optical properties of snow," Reviews of Geophysics 20(1), pp. 67-89 (1982).
Weeks & Lee, "Observations on the Physical Properties of Sea-Ice at Hopedale, Labrador," Arctic 11(3), pp. 134-155 (1958).
Weikusat, et al., "Subgrain boundaries and related microstructural features in EDML (Antarctica) deep ice core," Journal of Geology 55(191), pp. 461-472 (2009).
Wellner, et al., "Distribution of glacial geomorphic features on the Antarctic continental shelf and correlation with substrate: implications for ice behavior," Journal of Glaciology 47(158), pp. 397-411 (2001).
Worby, et al., "East Antarctic Sea Ice: A Review of Its Structure, Properties and Drift," Antarctic Sea Ice: Physical Processes, Interactions and Variability 74, pp. 41-67 (1998).
Yen, "Review of Thermal Properties of Snow, Ice and Sea Ice," CRREL Report 81-10, 37 pages (1981).

\* cited by examiner

FIG. 3A
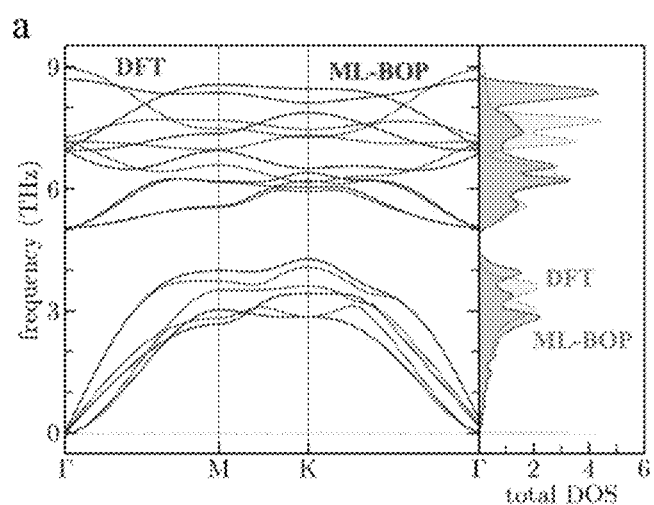
FIG. 3B
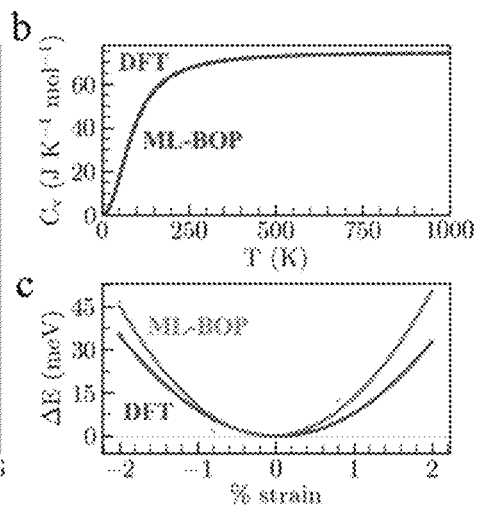
FIG. 3C
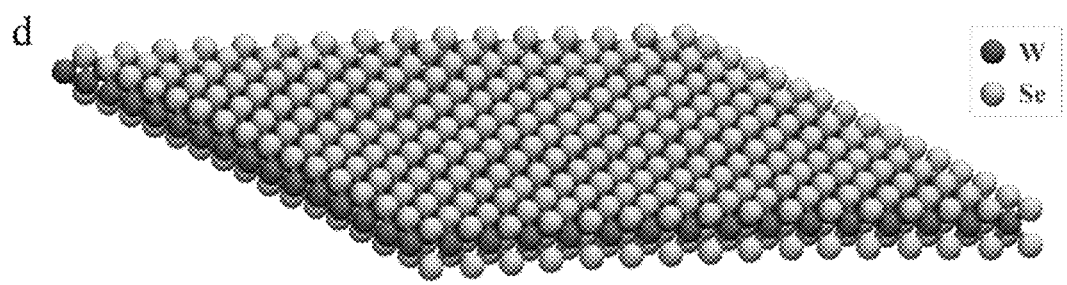
FIG. 3D

SYSTEMS AND METHODS FOR HIERARCHICAL MULTI-OBJECTIVE OPTIMIZATION

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present invention relates generally to systems and methods of design optimization. Certain embodiments relate to hierarchical multi-objective optimization.

BACKGROUND

Various optimization problems involve simultaneous optimization of multiple objectives (e.g., obtaining parameters or simultaneously capturing several properties of a material). However, computational approaches, such as assigning a weight to each objective or Pareto optimization, to solving such problems can often require a user to provide an arbitrary set of weights or select from a pool of solutions, which can result in suboptimal, compromise solutions.

SUMMARY

At least one aspect relates to a system. The system can include one or more processors configured to access at least one first candidate input, generate a first candidate output by providing the at least one first candidate input as input to a first objective function of a plurality of objective functions, determine whether the first candidate output satisfies a first objective condition associated with the first objective function, assign, responsive to the first candidate output not satisfying the first objective condition, a first penalty to the at least one first candidate input and/or performing early termination of evaluation of the at least one first candidate input, responsive to the first candidate output satisfying the first objective condition: generate a second candidate output by providing the at least one first candidate input as input to a second objective function of the plurality of objective functions, and assign, responsive to the second candidate output not satisfying a second objective condition associated with the second objective function, a second penalty value to the at least one first candidate input and/or performing early termination, evaluate a convergence condition using the at least one first candidate input and each penalty value associated with the at least one first candidate input, adjust, responsive to the at least one first candidate input not satisfying the convergence condition, the at least one first candidate input to generate at least one second candidate input to evaluate using the plurality of objective functions, and output, responsive to the at least one first candidate input satisfying the convergence condition, the at least one first candidate input. The use of the penalty values and/or early termination can enable efficient use of computational resources.

At least one aspect relates to a method for hierarchical multi-objective optimization. The method can include accessing, by one or more processors, at least one first candidate input, generating, by the one or more processors, a first candidate output by providing the at least one first candidate input as input to a first objective function of a plurality of objective functions, determining, by the one or more processors, whether the first candidate output satisfies a first objective condition associated with the first objective function, assign, by the one or more processors responsive to the first candidate output not satisfying the first objective condition, a first penalty to the at least one first candidate input and/or performing early termination, responsive to the first candidate output satisfying the first objective condition: generating, by the one or more processors, a second candidate output by providing the at least one first candidate input as input to a second objective function of the plurality of objective functions, and assigning, by the one or more processors responsive to the second candidate output not satisfying a second objective condition associated with the second objective function, a second penalty value with the at least one first candidate input and/or performing early termination, evaluating, by the one or more processors, a convergence condition using the at least one first candidate input and each penalty value associated with the at least one first candidate input, adjusting, by the one or more processors responsive to the at least one first candidate input not satisfying the convergence condition, the at least one first candidate input to generate at least one second candidate input to evaluate using the plurality of objective functions, and outputting, by the one or more processors responsive to the at least one first candidate input satisfying the convergence condition, the at least one first candidate input. The use of the penalty values and/or early termination can enable efficient use of computational resources.

At least one aspect relates to a method. The method can include optimizing a plurality of objective functions by iteratively: selecting an objective function from the plurality of objective functions based at least on a hierarchy assigned to the plurality of objective functions; applying a set of parameters to the selected objective function to generate an output of the selected objective function; responsive to the output not satisfying a tolerance condition for the output, assigning a penalty to the set of parameters and/or performing early termination, and evaluating a convergence condition using the set of parameters and the penalty; responsive to the output satisfying the tolerance condition, evaluating one or more additional objective functions of the plurality of objective functions using the set of parameters in an order corresponding to the hierarchy or evaluating the convergence condition responsive to the selected objective function being a final objective function of the plurality of objective functions; modifying the set of parameters using a genetic algorithm responsive to the set of parameters not satisfying the convergence condition; and outputting the set of parameters responsive to the set of parameters satisfying the convergence condition. The use of the penalties and/or early termination can enable efficient use of computational resources.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 3A-3D depict charts of optimization of multiple objectives for modelling $WSe_2$.

DETAILED DESCRIPTION

Figure 1:
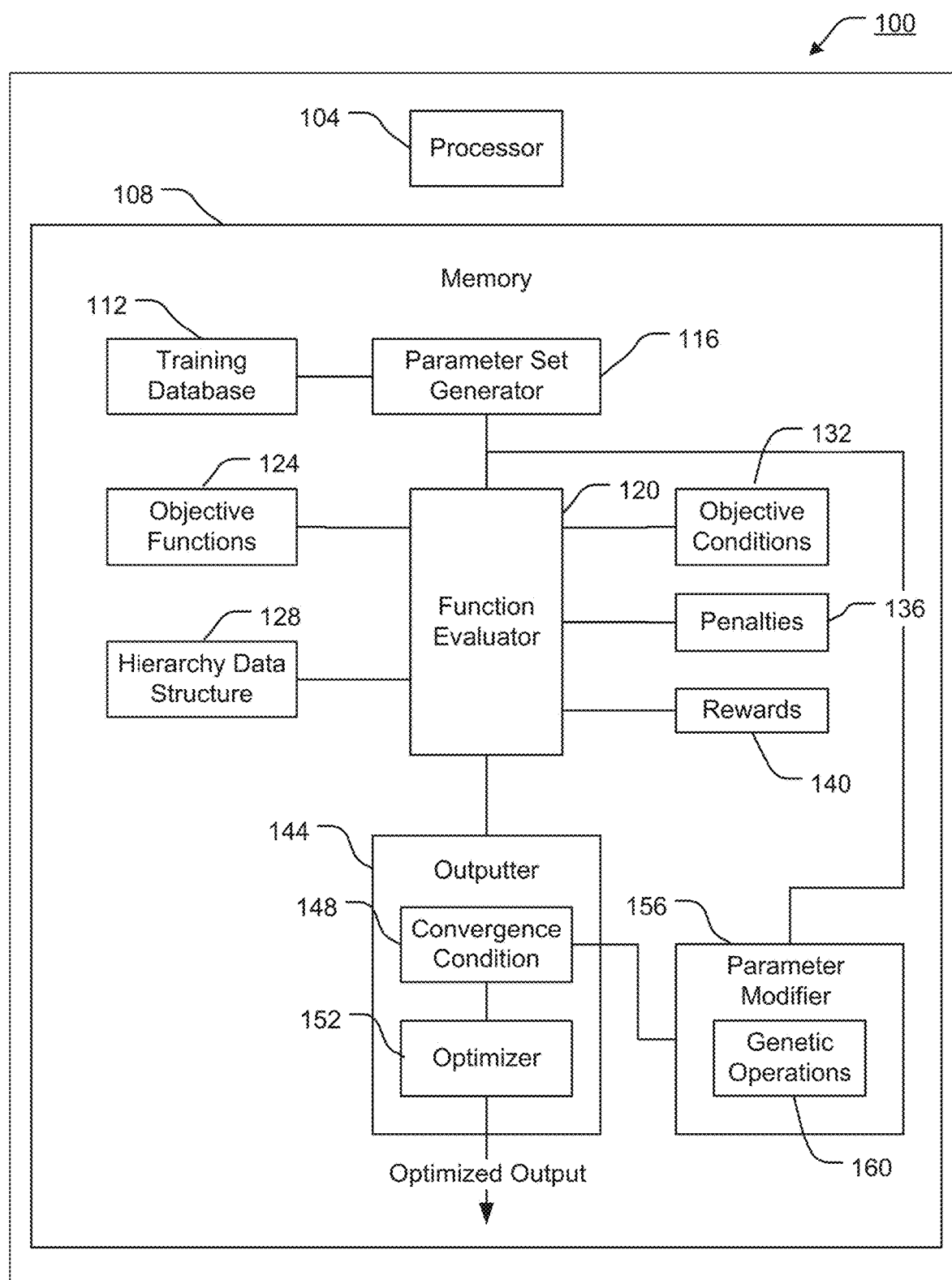
FIG. 1 is a block diagram of a multi-objective hierarchical optimization system.

Embodiments described herein relate generally to methods of design optimization using multi-objective hierarchical optimization. Multi-objective hierarchical optimization can be used to systematically evaluate multiple objectives associated with computational optimization, without requiring arbitrary weights to be assigned to the objectives to determine whether the optimization is proceeding effectively.

Various problems, including in material design and engineering, can involve simultaneous optimization of many properties, such as composition, topology, mechanics, or stability. For example, such multi-objective considerations may arise in solving problems such as identifying a best composition of alloys that result in a strong yet lightweight material, or identifying cost efficient materials that are best for long-term applications under extreme temperatures.

Existing optimization algorithms, such as genetic algorithms, Monte Carlo methods, or decision tree searching, are design to work well for a single objective, where the objective can represent a score that indicates a quality of a candidate solution. For problems involving multiple objectives, some approaches assign weight to each objective (e.g., assign a higher weight to a more important objective), and then sum the results for each objective into a combined score. In such approaches, one or a small number of properties may be predicted well based on the objectives corresponding to the properties, whereas several others may tend to suffer heavily during the optimization process, which can result in suboptimal outputs or computational resources or time required to reach an optimal solution being greater. As such, it can be difficult to reliably determine estimates for multiple objectives concurrently, including for optimizing the model for and properties of materials.

For example, the weight-based approach can have weights that are arbitrarily assigned, as there is no systematic manner to do the assignments, and an optimization algorithm can tend to select a compromised candidate that is "good at nothing" if the relatively differences between weights are more or less equal, or tend to optimize only a highest-weighted objective if the weights are relatively different from one another. Pareto optimization approaches can require a user to select an appropriate model, from a large pool of candidates, that best represents the compromise between various objectives (e.g., beyond three objectives, there are generally no established guidelines for choosing the appropriate model).

Systems and methods performed in accordance with the present solution can enable improved optimization of problems involving multiple objectives by implementing a hierarchy for sequentially evaluating the objectives, along with defined target values for each objective (e.g., as compared to arbitrary weights). This can enable the systems and methods to process the objectives in a systematic manner, providing a solution approach applicable to various types of model or property optimization, which can enable reduced computational resource usage to effectively achieve optimization. As described herein, systems and methods in accordance with the present solution can be implemented to solve a variety of computational problems, including but not limited to optimizing interatomic potentials for molecular simulations, optimization involving long evaluation times (e.g., calculation of dynamic properties of materials), modelling molecular systems such as coarse grained water, or modelling multicomponent systems such as $WSe_2$, and performing such optimizations for a large number of objectives, including but not limited to objectives such as phonon dispersion, equations of state, cohesive energy, dynamic stability, melting points, densities in various phases and at various temperatures, and various other such properties.

FIG. 1 depicts a system 100 for hierarchical optimization of multiple objectives. The system 100 includes one or more processors 104 and memory 108, which can be implemented as one or more processing circuits. The processor 104 may be a general purpose or specific purpose processor, an application specific integrated circuit (ASIC), one or more field programmable gate arrays (FPGAs), a group of processing components, or other suitable processing components. The processor 104 may be configured to execute computer code or instructions stored in memory 108 (e.g., fuzzy logic, etc.) or received from other computer readable media (e.g., CDROM, network storage, a remote server, etc.) to perform one or more of the processes described herein. The memory 108 may include one or more data storage devices (e.g., memory units, memory devices, computer-readable storage media, etc.) configured to store data, computer code, executable instructions, or other forms of computer-readable information. The memory 108 may include random access memory (RAM), read-only memory (ROM), hard drive storage, temporary storage, non-volatile memory, flash memory, optical memory, or any other suitable memory for storing software objects and/or computer instructions. The memory 108 may include database components, object code components, script components, or any other type of information structure for supporting the various activities and information structures described in the present disclosure. The memory 108 may be communicably connected to the processor 104 and may include computer code for executing (e.g., by processor 104) one or more of the processes described herein. The memory 108 can include various modules (e.g., circuits, engines) for completing processes described herein. The one or more processors 104 and memory 108 may include various distributed components that may be communicatively coupled by wired or wireless connections; for example, various portions of system 100 may be implemented using one or more client devices remote from one or more server devices. The memory 108 can include various software or firmware engines, modules, scripts, databases, or other computer code to implement the various components described herein, including the training database 112, parameter set generator 116, function evaluator 120, objective functions 124, hierarchy data structure 128, objective conditions 132, penalty scores 136, reward scores 140, outputter 144, and parameter modifier 156, or features or functions thereof.

The system 100 can include a training database 112. The training database 112 can include candidate inputs, such as candidate data points, that can be used to perform a multiple objective optimization (e.g., optimize objective functions 124). For example, the candidate data points can be represented using a data structure that includes one or more data point values for each of one or more parameters that are to be provided as inputs to the optimization. The candidate data points can represent material properties, environmental properties, or various other properties of the models or systems to be optimized.

The system 100 can include a parameter set generator 116. The parameter set generator 116 can identify candidate data points from the training database 112 to use for the optimization. The parameter set generator 116 can randomly select candidate data points from the training database 112. The parameter set generator 116 can generate candidate data points based on first principles associated with the problem to be optimized, such as surrogate functions or other models associated with the problem to be optimized, which can enable more effective optimization (e.g., by starting from input values that may be reasonably close to the optimal values).

The system 100 can include a function evaluator 120. Briefly, the function evaluator 120 can provide candidate inputs (e.g., a set of candidate data point(s)) as input to one or more objective functions 124. The function evaluator 120 can perform a trial (e.g., iteration of evaluation) of each set of candidate data point(s) received from the training database 112 or the parameter set generator 116 by providing the set of candidate data point(s) to each objective function 124 to be evaluated for a particular multiple objective optimization.

The objective functions 124 can each represent a particular objective of the multi-objective optimization. The objective functions 124 can be equations, algorithms, procedures, filters, characteristics, or any other functions that receive input, such as data points from the parameter set generator 116, and process the input to provide one or more outputs. The objective functions 124 can represent properties of materials to be modeled or optimized. The objective functions 124 can include functions such as error in relative equations of state, stability of materials or particular layers of materials, or phonon dispersion. The objective functions 124 can generate qualitative outputs, such as rankings, orderings, or classifications. The objective functions 124 may include probabilistic or statistical functions. The objective functions 124 can generate temporal data (e.g., multiple output data points each assigned to a respective point in time). The objective functions 124 can be based on outputs from other objective functions 124, such as to indicate an ordering of outputs from other objective functions 124 (e.g., relative ordering of densities at various temperatures as shown in Table 1 below) or to provide a statistical measure, such as standard deviation, of outputs from one or more other objective functions 124.

The system 100 can include a hierarchy data structure 128. The hierarchy data structure 128 can indicate an order (e.g., relative order) in which to evaluate the objective functions 124 using inputs from the parameter set generator 116. The hierarchy data structure 128 can assign ranks to each objective function 124 to indicate the order in which to evaluate each objective function 124. As described further herein, because the objective functions 124 are evaluated according to the hierarchy data structure 128, higher ranked objective function(s) 124 may be evaluated while lower ranked objective function(s) 124 may not be evaluated if the output from the higher ranked objective function(s) 124 does not meet appropriate tolerances (e.g., objective conditions 132), which can cause the system 100 to terminate evaluation of the objective functions 124 using a selected at least one candidate data point before evaluating the remaining, lower ranked objective function(s) 124. The system 100 can update the hierarchy data structure 128 responsive to user input. The system 100 can maintain multiple hierarchy data structures 128, each assigned to a respective multiple objective optimization, enabling the system 100 to perform optimizations of problems associated with various sets of objective functions 124. The hierarchy data structure 128 can be used in combination with other systems, such as weighting or Pareto based optimizations. For instance, each objective function 124 may correspond to a single material property, but can also be a group of correlated material properties combined using the weighting approach (e.g., root mean square deviation of atomic positions compared to target structure and energy of structure represented by a set of atomic positions can be grouped to describe a property named geometry of structure plus strength of structure).

For example, the hierarchy data structure 128 can indicate a first objective function 124 to evaluate first, a second objective function 124 to evaluate subsequent to evaluating the first objective function 124 (e.g., if output from the first objective function 124 meets appropriate tolerances), a third objective function 124 to evaluate subsequent to evaluating the first and second objective functions 124 (e.g., if output from the first and second objective functions 124 each meet appropriate tolerances), and so on for each objective function 124 to be evaluated for a particular multi-objective optimization. The hierarchy data structure 128 may order the objective functions 124 based on at least one of an importance criteria of each objective function 124 and a measure of computational resources required to evaluate each objective function 124.

The hierarchy data structure 128 can be determined responsive to user input. For example, the system 100 can receive user input indicating one or more objective functions 124 to evaluate with relatively higher priority as compared to other objective functions 124 (e.g., via a user input device or a network communications device, not depicted). The system 100 can determine the hierarchy data structure 128 based on at least one of the importance criteria (e.g., importance score) or the measure of computational resources associated with each objective function 124. For example, the system 100 can determine the importance criteria using the user input, a predefined importance criteria maintained in memory 108, or any combination thereof. The system 100 can determine the measure of computational resources by executing the objective function 124 (e.g., providing random or test input to the function 124) and monitoring computational resources used by the objective function 124 to generate output, by retrieving a predefined estimate of the measure of computational resources maintained in memory 108, or any combination thereof.

The system 100 can include objective conditions 132 that correspond to respective objective functions 124. The objective conditions 132 can be values or combinations of values such as thresholds, tolerances or target values that the system 100 attempts to achieve to optimize the corresponding objective functions 124. Each objective condition 132 can be assigned to a particular objective function 124, such as by a mapping maintained in memory 108. The objective conditions can be evaluated using the output of the objective functions 124 as well as parameters determined based on the output, such as standard deviations of the output (e.g., standard deviations of the output determined responsive to using the function evaluator 120 to cause the objective function 124 to generate multiple outputs using the at least one candidate data point, such as for multiple outputs as a function of time).

The system 100 can evaluate outputs of the objective functions 124 that the function evaluator 120 generates by applying data points from the parameter set generator 116 to the objective functions 124 to evaluate the objective conditions 132. The function evaluator 120 can compare the output from the objective function 124 to corresponding objective conditions 132 (e.g., compare to minimum and/or maximum threshold values defining a tolerance range) and determine the output to satisfy the objective conditions 132 responsive to the output meeting the objective conditions 132 (e.g., the output being less than the maximum threshold value and greater than the minimum threshold value). For example, for a particular objective function 124, the corresponding objective condition 132 can include a minimum threshold value and a maximum threshold value, and the function evaluator 120 can determine the objective condition 132 to be satisfied responsive to output from the function evaluator 120 for the objective function 124 to be greater than the minimum threshold value and less than the maximum threshold value. Table 1 below provides an example of fifteen objective functions ordered in a hierarchy (e.g., based on a hierarchy data structure 128) and objective conditions associated with each respective objective function. As shown in Table 1, the objective conditions can be tolerances for each output generated by each objective function, include tolerances for values of the outputs as well as associated standard deviations:

objective function 124, and assign a penalty score 136 to the at least one first candidate data point responsive to the output not satisfying the objective conditions 132 corresponding to the selected objective function 124.

The penalty scores 136 and reward scores 140 can be predetermined values. The penalty scores 136 and reward scores 140 can be predetermined values specific to corresponding objective functions 124 or objective conditions 132. The penalty scores 136 (or reward scores 140) can be determined at least based on a difference between the output of the objective function 124 and thresholds or target values indicated by the objective conditions 132; for example, greater penalty scores 136 may be assigned based on differences between the output and the objective conditions 132 being greater.

The function evaluator 120 can provide at least one of the at least one first candidate data point or the output generated using the at least one first candidate data point (e.g., first candidate output) to an outputter 144. The outputter 144 can determine whether the at least one first candidate data point qualifies as an optimum of the multiple objective functions 124, or cause the system 100 to continue to evaluate candidate data points in order to detect the optimum of the multiple objective functions 124.

The outputter 144 can maintain at least one convergence condition 148. The convergence condition 148 can indicate whether the at least one first candidate data point satisfies requirements for the optimum of the multiple objectives 124. The convergence condition 148 can include or be based on the objective conditions 132. While FIG. 1 depicts the at

TABLE 1

Hierarchical ranks of each objective function and corresponding tolerances conditions for fifteen objectives of a multi-objective optimization.

| Rank | Objective Function | Objective Conditions |
|---|---|---|
| 1 | Minimized structure of ice $I_h$, equation of state | RMSD < 0.7 Å, ΔE < 0.1 eV |
| 2 | Time averaged density of ice $I_h$, T = 273 K, P = 1 bar ($\rho_{Ih,\ 273\ K,\ 1\ bar}$) | $\|\rho_{predicted} - \rho_{exp}\|$ < 2%, SD < 0.01% |
| 3 | Time averaged density of ice $I_h$, T = 253 K, P = 1 bar ($\rho_{Ih,\ 253\ K,\ 1\ bar}$) | $\|\rho_{predicted} - \rho_{exp}\|$ < 2%, SD < 0.01% |
| 4 | Time averaged density of ice $I_h$, T = 213 K, P = 1 bar ($\rho_{Ih,\ 213\ K,\ 1\ bar}$) | $\|\rho_{predicted} - \rho_{exp}\|$ < 2%, SD < 0.01% |
| 5 | Relative ordering of $\rho_{Ih,\ 1\ bar}$ | $\rho_{Ih,\ 273\ K,\ 1\ bar} < \rho_{Ih,\ 253\ K,\ 1\ bar} < \rho_{Ih,\ 253\ K,\ 1\ bar}$ |
| 6 | Time averaged density of liquid, T = 338 K, P = 1 bar ($\rho_{liq,\ 338\ K,\ 1\ bar}$) | $\|\rho_{predicted} - \rho_{exp}\|$ < 2%, SD < 0.01% |
| 7 | Time averaged density of liquid, T = 273 K, P = 1 bar ($\rho_{liq,\ 273\ K,\ 1\ bar}$) | $\|\rho_{predicted} - \rho_{exp}\|$ < 1.5%, SD < 0.01% |
| 8 | Stability of ice $I_h$-liquid interface, melting point of ice $I_h$ ($T_m$) | $T_m$ within 20 K |
| 9 | Enthalpy of melting of ice $I_h$ ($\Delta H_{melt}$) | $\|\Delta H_{predicted} - \Delta H_{exp}\|$ < 30% |
| 10 | Time averaged density of liquid, T = 300 K, P = 1 bar ($\rho_{liq,\ 300\ K,\ 1\ bar}$) | $\|\rho_{predicted} - \rho_{exp}\|$ < 1.5%, SD < 0.01% |
| 11 | Time averaged density of liquid, T = 277 K, P = 1 bar ($\rho_{liq,\ 277\ K,\ 1\ bar}$) | $\|\rho_{predicted} - \rho_{exp}\|$ < 1%, SD < 0.01% |
| 12 | Time averaged density of liquid, T = 263 K, P = 1 bar ($\rho_{liq,\ 263\ K,\ 1\ bar}$) | $\|\rho_{predicted} - \rho_{exp}\|$ < 3.5%, SD < 0.02% |
| 13 | Time averaged density of liquid, T = 253 K, P = 1 bar ($\rho_{liq,\ 253\ K,\ 1\ bar}$) | $\|\rho_{predicted} - \rho_{exp}\|$ < 4%, SD < 0.02% |
| 14 | Relative ordering of $\rho_{liq,\ 1\ bar}$ at T = 253, 263, 273, 277, 300, 338 K | no more than 1 wrong order |
| 15 | Enthalpy and free energy difference between ice $I_h$ and $I_c$ | (for ML-BOP$_{dih}$ only) |

The system 100 can maintain penalty scores 136 and reward scores 140. At least one penalty score 136 or reward score 140 can be assigned to each set of candidate data point(s) that the parameter set generator 116 provides to the function evaluator 120 (e.g., for each trial of a set of candidate data point(s)). For example, the function evaluator 120 can receive at least one first candidate data point from the training database 112 or the parameter set generator 116, apply the at least one first candidate data point to a selected objective function 124 to cause the selected objective function 124 to generate an output using the at least one first candidate data point, evaluate the output using the objective conditions 132 corresponding to the selected objective function 124, assign a reward score 140 to the at least one first candidate data point responsive to the output satisfying the objective conditions 132 corresponding to the selected least one convergence condition 148 as being implemented by the outputter 144 separately from the objective conditions 132, the at least one convergence condition 148 may be evaluated by the function evaluator 120 evaluating the objective conditions 132. The outputter 144 can maintain a record of the result of evaluating the convergence condition 148 for each at least one candidate data point, which can enable monitoring of how modifications to the candidate data points affects the pathway towards identifying the optimum of the multiple objective functions 124.

For example, the convergence condition 148 can be satisfied based at least on the outputs of the objective functions generated using the function evaluator 120 each satisfying respective objective conditions 132. The convergence condition 148 can be satisfied based on minimization, maximization, or minimization of a difference with respect to a target value, each output of each respective objective function 124. The convergence condition 148 can be satisfied based on differences between the candidate data points evaluated during a current iteration and one or more previous iterations being less than a threshold difference, which can indicate that the system 100 has converged to the solution that optimizes the objective functions 124. The outputter 144 can retrieve each penalty score 136 and reward score 140 assigned to the at least one candidate data point to evaluate the convergence condition 148, such as by detecting convergence as reward scores increase or not detecting convergence as penalty scores increase.

Responsive to determining that the at least one first candidate data point does not satisfy the convergence condition 148, the outputter 144 can trigger evaluation of different candidate data points. For example, the outputter 144 can cause the parameter set generator 116 to retrieve (e.g., from the training database 112) at least one second candidate data point different from the at least one first candidate data point to provide to the function evaluator 120, or can cause a parameter modifier 156 to modify the at least one first candidate data point to modify the at least one first candidate data point to generate the at least one second candidate data point.

Responsive to determining that the at least one first candidate data point does satisfy the convergence condition 148, the outputter 144 can provide an optimized output indicative of an optimum of the objective functions 124. The output can include the at least one first candidate data point. The output can include the outputs of each objective function 124 generated using the at least one first candidate data point.

The outputter 144 may include an optimizer 152, which can further optimize the at least one first candidate data point responsive to determining that the at least one first candidate data point satisfies the convergence condition 148. For example, the optimizer 152 can apply any of a variety of optimization algorithms (e.g., local optimization algorithms) to the at least one first candidate data point to generate the optimized output, such as by restricting a search space to a threshold distance and performing the local optimization within the threshold distance.

The parameter modifier 156 can modify the at least one first candidate data point to generate at least one second candidate data point to be further evaluated by the function evaluator 120. The parameter modifier 156 can modify values of one or more of the at least one first candidate data point to generate the at least one second data point. The parameter modifier 156 can selectively modify values of the one or more at least one first candidate data point, such as values more strongly associated with objective conditions 132 that were not satisfied by the output generated using the at least one first candidate data point.

The parameter modifier 156 can apply one or more genetic operations 160 to the at least one first candidate data point to generate the at least one second candidate data point. For example, a crossover operation can be performed in which one or more features (e.g., data points) of at least one third candidate data point are combined with the at least one first candidate data point. Performing the crossover may include identifying the at least one third candidate data point randomly, or using reward scores or penalty scores assigned to the at least one third candidate data point. Performing the crossover may include substituting one or more data points of the at least one third candidate data point for one or more data points of the at least one first candidate data point, or performing an average of data points. The parameter modifier 156 can apply a mutation operation to the at least one first candidate data point to generate the at least one second candidate data point. For example, the parameter modifier 156 can evaluate a mutation probability threshold for one or more data points of the at least one first candidate data points, and modify the one or more data points responsive to a randomly generated probability score meeting or exceeding the probability threshold. The parameter modifier 156 can modify the one or more data points by adjusting a value of the one or more data points. The parameter modifier 156 can adjust the value using a predetermined adjustment value, using a randomly generated adjustment value, or a combination thereof (e.g., applying an adjustment value randomly selected from a predetermined range of adjustment values).

The function evaluator 120 can evaluate the at least one second candidate data point by providing the at least one second candidate data point as input to the objective functions 124, and evaluating the outputs of the objective functions 124 using the objective conditions 132. The system 100 can iteratively evaluate numerous sets of candidate data points, using the hierarchy data structure 128, to arrive at the optimum of the multiple objective optimization indicated by the objective functions 124.

Figure 2:
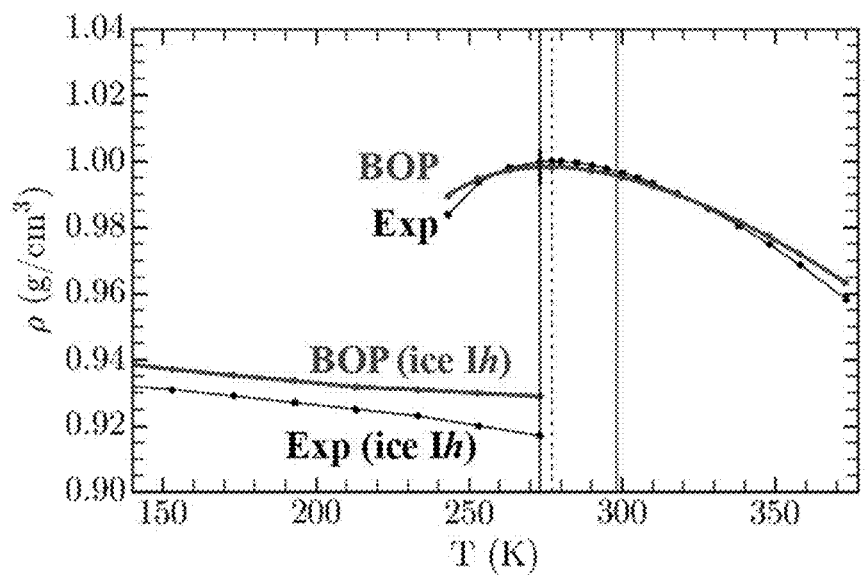
FIG. 2 depicts charts of optimization of multiple objectives for modelling coarse grained water.
Figure 2:
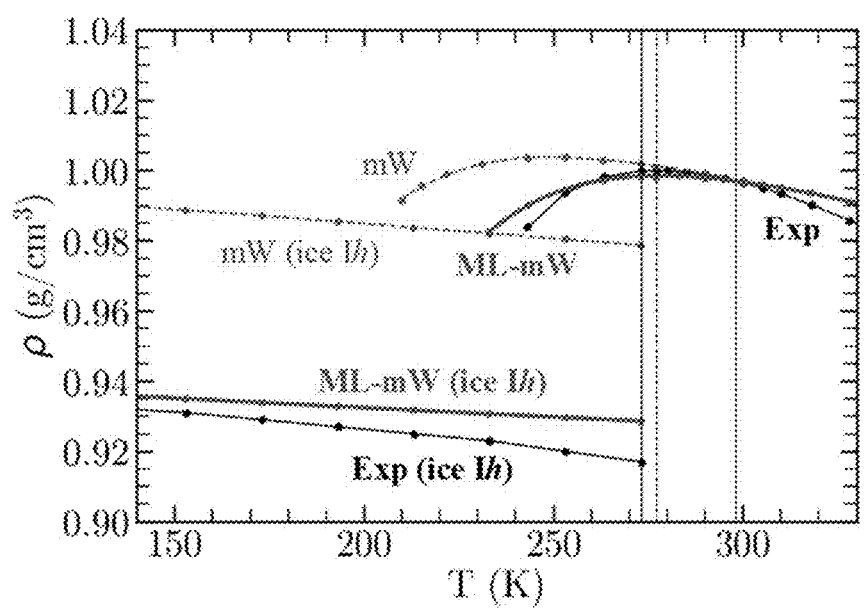

FIG. 2 depicts optimization 200 of models for coarse grain water. For example, the optimization 200 of the models can be performed by using the hierarchy of objective functions shown in Table 1. The optimized models (e.g., models using bond order potential (BOP) trained by machine learning using hierarchical multi-objective optimization; Stillinger-Weber (mW) models trained by machine learning using hierarchical multi-objective optimization) are compared to expected, demonstrating the effectiveness of training using hierarchical multi-objective optimization for density at various temperatures.

FIGS. 3A-3D depict optimization 300 of models of $WSe_2$. For example, optimization 300 can include optimization of energies, structures, and temperature dependent transformations of a small Selenium cluster, including phonon dispersion, equations of state, cohesive energy, and dynamic stability of $WSe_2$. Optimization 300 can be performed to optimize a model of $WSe_2$ in a space of over twenty four dimensions (e.g., BOP model), and is shown in comparison to density functional theory (DFT) modelling, demonstrating the effectiveness of using the hierarchical multi-objective optimization.

Figure 4:
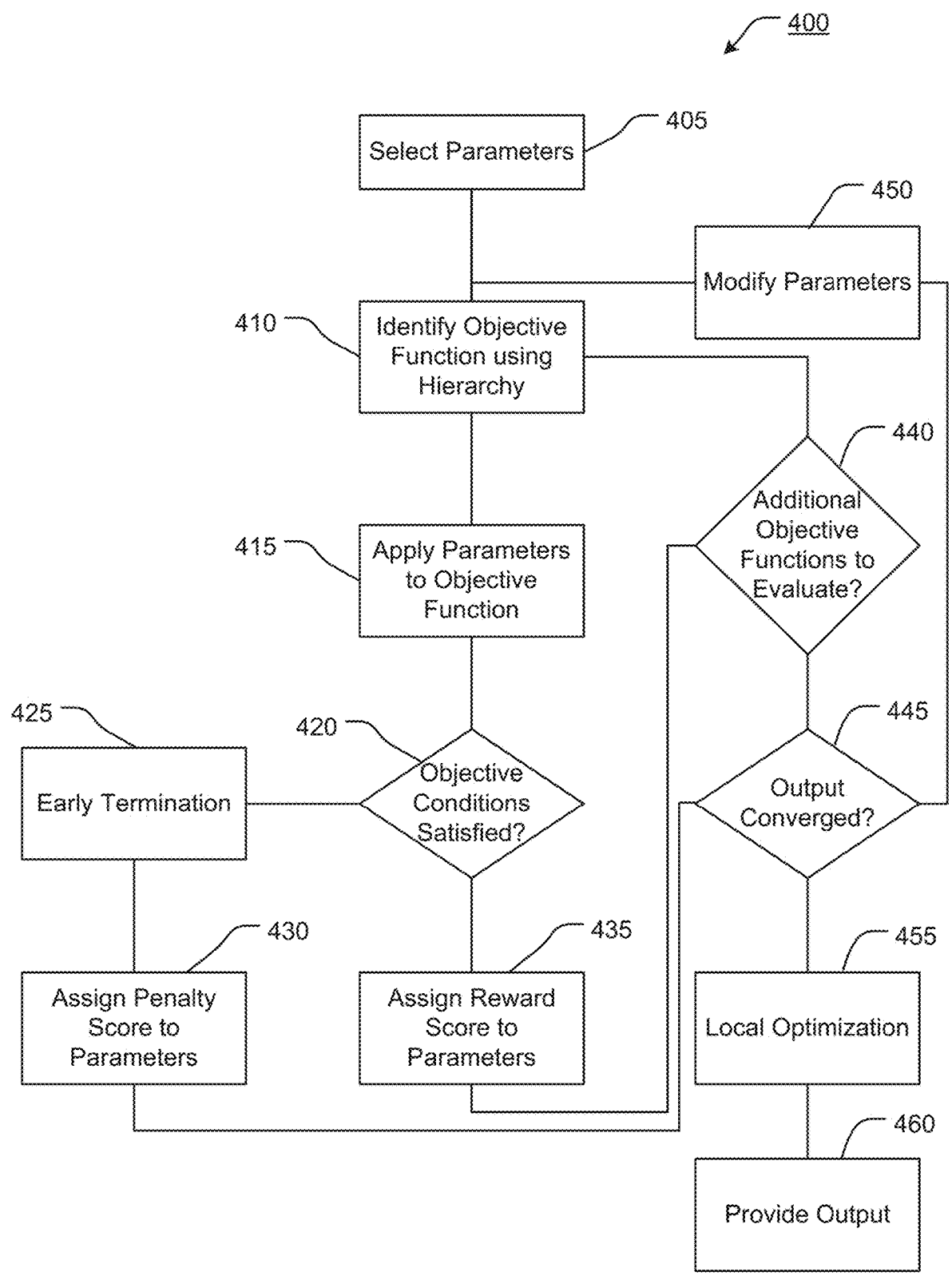
FIG. 4 is a flow diagram of a method for multi-objective hierarchical optimization.

FIG. 4 depicts a method 400 for hierarchical multiple objective optimization. The method 400 can be performed using various systems described herein, including the system 100. Various steps in the method 400 may be repeated, omitted, performed in various orders, or otherwise modified.

At 405, a set of parameters to use to optimize the objectives is selected. The set of parameters can represent candidate data points to be provided as input to the objective functions of the optimization to determine if outputs of the objective functions generated using the candidate data points represent an optimum of the objective functions. The set of parameters can be selected from a training database of parameters. The set of parameters can be randomly selected (or generated). The candidate data points can represent material properties, environmental properties, or various other properties of the models or systems to be optimized. The set of parameters can be determined based on first principles associated with the problem to be optimized, such as surrogate functions or other models associated with the problem to be optimized.

At 410, an objective function is identified using a hierarchy of objective functions. The hierarchy can rank each of the multiple objective functions of the optimization to indicate an order in which to evaluate the objective functions, such as to indicate first, second, third, etc. functions to evaluate. By arranging the objective functions in the hierarchy, early termination of evaluation of relatively poor candidate data points can be performed, reducing resource expenditure on evaluating less important and/or more computationally intensive objective functions that are ranked lower in the hierarchy. The objective function can be identified by retrieving an index of the objective function from a hierarchy data structure (e.g., based on an index of a previously evaluated objective function) that represents the hierarchy. The hierarchy can be generated or updated responsive to user input. As described further below, the objective function can be identified responsive to a previously evaluated objective function satisfying corresponding objective conditions.

At 415, the set of parameters is applied as an input to the identified objective function. The identified objective function can generate at least one output (e.g., at least one candidate output) responsive to the set of parameters. The objective function can generate the at least one output to include values such as thermodynamic properties, kinetic properties, material properties, errors in relative equations of state, stability of materials or particular layers of materials, phonon dispersion, rankings, orderings, or classifications. The objective function can generate the at least one output responsive to multiple operations using the input, such as to provide statistical measures such as standard deviation.

At 420, it is determined whether one or more objective conditions associated with the objective function are satisfied. The one or more objective conditions can be identified based on a mapping (e.g., database, lookup table) that relates objective conditions to objective functions. The objective conditions can be evaluated using the output generated by the objective function responsive to the set of parameters. The objective conditions can include various tolerances, threshold values, or, target values to be achieved for the output as well as values determined based on multiple outputs, such as standard deviations. As an example, the output can be compared to a minimum threshold value and a maximum threshold value of the objective condition assigned to the objective function, and the objective condition can be determined to be satisfied responsive to the output being greater than the minimum threshold value and less than the maximum threshold value. The objective condition can be determined to not be satisfied responsive to outputs of the objective function not satisfying each objective condition assigned to the objective function, such if a value of the output meets appropriate thresholds (e.g., as shown for the second objective function relating to time averaged density of ice $I_h$ in Table 1, the time averaged density may be within two percent of an expected value, but a standard deviation of the density values may be greater than a 0.01 percent threshold for standard deviation, resulting in the objective conditions not being satisfied).

At 425, early termination of evaluation of the set of parameters can be performed responsive to the objective conditions not being satisfied. As discussed above, this can allow for resource expenditure on evaluating further objective functions to be avoided for relatively poor candidates. For example, if the multiple objective optimization includes a hierarchy for optimizing six objective functions, but the output of the third objective function does not meet objective conditions assigned to the third objective function, evaluation of the fourth, fifth, and sixth objective functions in the hierarchy may be skipped by proceeding to determine whether convergence has been achieved rather than identifying and evaluating the fourth (and fifth and sixth) objective functions.

At 430, a penalty score can be assigned to the set of parameters (e.g., responsive to determining to perform early termination), which can be used for determining whether the output generated using the set of parameters has converged to an optimum. The penalty score can be a predetermined value assigned to the objective function and retrieved from a penalty score database responsive to the output of the objective function not satisfying the objective conditions. The penalty score can be determined based at least on a difference between the output and thresholds or target values of the objective conditions; for example, greater penalty scores may be assigned based on differences between the output and the objective conditions being greater.

At 435, a reward score can be assigned to the set of parameters responsive to the set of parameters (e.g., the output generated therefrom) satisfying the objective conditions. The reward score can be used to promote solutions that satisfy the objective conditions. The reward score can be a predetermined value assigned to the objective function and retrieved from a reward score database responsive to the output of the objective function satisfying the objective conditions. The reward score can be determined based on a difference between the output and thresholds or target values of the objective conditions; for example, greater reward scores may be assigned based on differences between the output and the objective conditions being lesser.

At 440, it can be determined whether an additional objective function is to be evaluated. It can be determined whether an additional objective function is to be evaluated responsive to the previously evaluated objective function satisfying the corresponding objective conditions (e.g., such that early termination is not performed). For example, the multiple objective optimization may include several objective functions to be evaluated using the set of parameters according to the order indicated by the hierarchy. Responsive to determining that an additional objective function is to be evaluated (e.g., using the hierarchy; or by maintaining a count of objective functions that are evaluated, incrementing the count each time iteration, and comparing the count to a maximum count), the additional objective function can be identified using the hierarchy and evaluated using the set of parameters as described above. For example, if the multiple objective optimization includes four objective functions to evaluate, it can be determined to evaluate additional objective functions until the fourth objective function in the hierarchy has been evaluated. As such, several iterations of objective function evaluations may be performed until early termination is performed or each objective function of the multiple objective functions is evaluated.

At 445, it can be determined whether the output generated using the set of parameters and the objective functions has converged. Convergence can be determined based on one or more convergence conditions. The convergence conditions may include the objective conditions used to evaluate the output of the objective functions. For example, the output can be determined to have converged responsive to each of the objective conditions for each of the objective functions being satisfied. Convergence may additionally or alternatively be determined responsive to a change in the outputs generated by the objective functions changing less than a threshold amount over one or more iterations of evaluating the objective functions using sets of parameters (e.g., the sets of parameters and the resulting outputs of the objective functions). The reward scores and penalty scores assigned to the outputs can be used to detect convergence to the optimum, such as to rank sets of parameters that result in outputs that satisfy at least some objective conditions.

At 450, responsive to determining that the output has not converged, the set of parameters can be modified. Modifying the set of parameters can include retrieving a different set of parameters from the training database. Modifying the set of parameters can include randomly modifying at least one parameter (e.g., at least one candidate data point) of the set of parameters. Modifying the set of parameters can include modifying one or more parameters based on the performance of the one or more parameters with respect to the objective conditions or the convergence conditions, such as to modify parameter(s) more strongly correlated with outputs that resulted in early termination or non-convergence.

Modifying the set of parameters can include applying genetic operations to one or more parameters of the set of parameters. For example, a crossover operation can be performed in which one or more features (e.g., data points) of at least one third candidate data point are combined with at least one first candidate data point of the set of parameters. Performing the crossover may include identifying the at least one third candidate data point randomly, or using reward scores or penalty scores assigned to the at least one third candidate data point. Performing the crossover may include substituting one or more data points of the at least one third candidate data point for one or more data points of the at least one first candidate data point, or performing an average of data points. A mutation operation may be performed in which one or more data points of the set of parameters are modified. For example, a mutation probability threshold for one or more data points of the set of parameters can be evaluated, and the one or more data points can be modified responsive to a randomly generated probability score meeting or exceeding the probability threshold. The one or more data points can be modified by adjusting a value of the one or more data points. The value can be adjusted using a predetermined adjustment value, using a randomly generated adjustment value, or a combination thereof (e.g., applying an adjustment value randomly selected from a predetermined range of adjustment values).

At 455, responsive to determining that the output has converged, local optimization can be performed. Local optimization can be performed to further optimize the output within a region around the output (e.g., a region in a multi-variable parameter space around the set of parameters used to generate the output). For example, any of a variety of optimization algorithms (e.g., local optimization algorithms) can be applied to the at least one first candidate data point to generate the optimized output, such as by restricting a search space to a threshold distance and performing the local optimization within the threshold distance.

At 460, the optimized output can be provided. The optimized output can be provided by being used to update an output data structure that includes fields for the set of parameters and the output (e.g., output for each objective function used for the optimization). The optimized output can be provided by presenting the output and/or the set of parameters using a display device. The optimized output can be provided by being transmitted to a remote electronic device.

Definitions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid control systems and methods of fluid control as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for hierarchical multi-objective optimization, comprising:
   accessing, by one or more processors, at least one first candidate input;
   generating, by the one or more processors, a first candidate output by providing the at least one first candidate input as input to a first objective function of a plurality of objective functions;
   determining, by the one or more processors, whether the first candidate output satisfies a first objective condition associated with the first objective function;
   assigning, by the one or more processors responsive to the first candidate output not satisfying the first objective condition, a first penalty to the at least one first candidate input;
   responsive to the first candidate output satisfying the first objective condition:
      selecting, by the one or more processors, a second objective function from the plurality of objective functions subsequent to determining whether the first candidate output satisfies the first objective condition, the second objective function selected by retrieving the second objective function, from memory coupled with the one or more processors, based on a predetermined hierarchy data structure indicating an order of evaluation of the plurality of objective functions;
      generating, by the one or more processors, a second candidate output by providing the at least one first candidate input as input to the second objective function; and
      associating, by the one or more processors responsive to the second candidate output not satisfying a second objective condition associated with the second objective function, a second penalty value with the at least one first candidate input;
   evaluating, by the one or more processors, a convergence condition using the at least one first candidate input and each penalty value associated with the at least one first candidate input;
   adjusting, by the one or more processors responsive to the at least one first candidate input not satisfying the convergence condition, the at least one first candidate input to generate at least one second candidate input to evaluate using the plurality of objective functions; and
   outputting, by the one or more processors responsive to the at least one first candidate input satisfying the convergence condition, the at least one first candidate input.

2. The method of claim 1, wherein adjusting the at least one first candidate input comprises applying, by the one or more processors, a genetic operation to the at least one first candidate input.

3. The method of claim 2, wherein applying the genetic operation comprises applying, by the one or more processors, at least one of (i) a mutation operation to the at least one first candidate input or (ii) a crossover operation to the at least one first candidate input using at least one second candidate input.

4. The method of claim 1, further comprising assigning, by the one or more processors responsive to the at least one first candidate input satisfying the first objective condition, a first reward value with the at least one first candidate input, wherein evaluating the convergence condition comprises evaluating, by the one or more processors, the convergence condition using the first reward value.

5. The method of claim 1, wherein evaluating the convergence condition comprises evaluating, by the one or more processors, the convergence condition without generating the second candidate output responsive to responsive to the first candidate output not satisfying the first objective condition.

6. The method of claim 1, further comprising applying, by the one or more processors responsive to outputting the at least one first candidate input, a local optimization function to the at least one first candidate input.

7. The method of claim 1, further comprising:
generating, by the one or more processors, a third candidate output by providing the at least one first candidate input as input to a third objective function of the plurality of objective functions; and
responsive to the third candidate output not satisfying a third objective condition associated with the third objective function, assigning, by the one or more processors a third penalty value with the at least one first candidate input and evaluating, by the one or more processors, the convergence condition using the at least one first candidate input and the third penalty value.

8. The method of claim 1, further comprising:
determining, by the one or more processors, an expected resource demand for operating each objective function of the plurality of functions by the one or more processors; and
generating, by the one or more processors, the hierarchy data structure based at least on the expected resource demand corresponding to each objective function.

9. A system, comprising:
one or more processors configured to:
 access at least one first candidate input;
 generate a first candidate output by providing the at least one first candidate input as input to a first objective function of a plurality of objective functions;
 determine whether the first candidate output satisfies a first objective condition associated with the first objective function;
 assign, responsive to the first candidate output not satisfying the first objective condition, a first penalty to the at least one first candidate input;
 responsive to the first candidate output satisfying the first objective condition:
  select a second objective function from the plurality of objective functions subsequent to determining whether the first candidate output satisfies the first objective condition, the second objective function selected by retrieving the second objective function, from memory coupled with the one or more processors, based on a predetermined hierarchy data structure indicating an order of evaluation of the plurality of objective functions;
  generate a second candidate output by providing the at least one first candidate input as input to the second objective function of the plurality of objective functions; and
  assign, responsive to the second candidate output not satisfying a second objective condition associated with the second objective function, a second penalty value to the at least one first candidate input;
 evaluate a convergence condition using the at least one first candidate input and each penalty value associated with the at least one first candidate input;
 adjust, responsive to the at least one first candidate input not satisfying the convergence condition, the at least one first candidate input to generate at least one second candidate input to evaluate using the plurality of objective functions; and output, responsive to the at least one first candidate input satisfying the convergence condition, the at least one first candidate input.

10. The system of claim 9, wherein the one or more processors are configured to adjust the at least one first candidate input by applying a genetic operation to the at least one first candidate input.

11. The system of claim 10, wherein the one or more processors are configured to apply the genetic operation by applying at least one of (i) a mutation operation to the at least one first candidate input or (ii) a crossover operation to the at least one first candidate input using at least one second candidate input.

12. The system of claim 9, wherein the one or more processors are configured to assign, responsive to the at least one first candidate input satisfying the first objective condition, a first reward value with the at least one first candidate input, and evaluate the convergence condition using the first reward value.

13. The system of claim 9, wherein the one or more processors are configured to evaluate the convergence condition without generating the second candidate output.

14. The system of claim 9, wherein the one or more processors are configured to apply a local optimization function to the at least one first candidate input responsive to outputting the at least one first candidate input.

15. The system of claim 9, wherein the one or more processors are configured to:
generate a third candidate output by providing the at least one first candidate input as input to a third objective function of the plurality of objective functions; and
responsive to the third candidate output not satisfying a third objective condition associated with the third objective function, assign a third penalty value with the at least one first candidate input and evaluate the convergence condition using the at least one first candidate input and the third penalty value.

16. The system of claim 9, wherein the one or more processors are configured to:
determine an expected resource demand for operating each objective function of the plurality of functions by the one or more processors; and
generate hierarchy data structure based at least on the expected resource demand corresponding to each objective function.

17. A method, comprising:
optimizing a plurality of objective functions by iteratively:
 selecting an objective function from the plurality of objective functions based at least on a hierarchy data structure assigned to the plurality of objective functions, the hierarchy data structure indicating an order of evaluation of the plurality of objective functions;
 applying a set of parameters to the selected objective function to generate an output of the selected objective function;
 responsive to the output not satisfying a tolerance condition for the output, assigning a penalty to the set of parameters and evaluating a convergence condition using the set of parameters and the penalty;
 responsive to the output satisfying the tolerance condition, evaluating one or more additional objective functions of the plurality of objective functions using the set of parameters in an order corresponding to the hierarchy or evaluating the convergence condition responsive to the selected objective function being a final objective function of the plurality of objective functions;

modifying the set of parameters using a genetic algorithm responsive to the set of parameters not satisfying the convergence condition; and outputting the set of parameters responsive to the set of parameters satisfying the convergence condition.

18. The method of claim 17, wherein the plurality of objective functions includes a function based on a group of correlated material properties.

* * * * *